Figure 1:
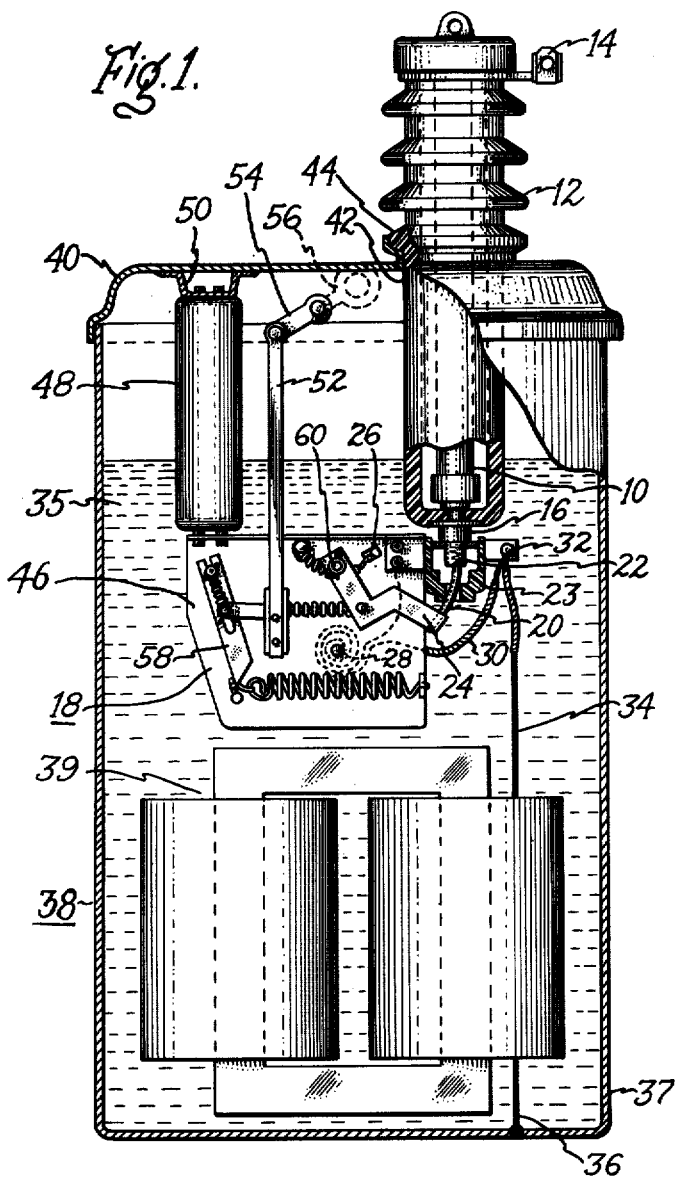

Inventor,
Sidney R. Smith, Jr,
by Francis K. Doyle
His Attorney

United States Patent Office 3,112,383
Patented Nov. 26, 1963

3,112,383
COMBINED CIRCUIT BREAKER AND FUSE
Sidney R. Smith, Jr., Stockbridge, Mass., assignor to General Electric Company, a corporation of New York
Filed Dec. 28, 1961, Ser. No. 162,876
1 Claim. (Cl. 200—114)

This invention relates to a protective device for an electrical apparatus, such as, for example, a transformer or the like, and more particularly to a combined high voltage circuit breaker and fuse for protecting electrical apparatus.

As is well known to those skilled in this art, it is desirable to provide protection for electrical apparatus, such as transformers and the like, to prevent overloads or internal faults of such apparatus from permanently damaging the apparatus. Also it is desirable that such overloads or faults be alleviated at the electrical apparatus subjected to them, since if the apparatus is allowed to continue functioning at the overload or fault current, such excessive current would eventually cause operation of a breaker or similar protective device further along the power line energizing the apparatus, thus tending to disrupt service to a larger segment of persons, than those dependent upon the overload or faulted electrical apparatus.

In the present state of the art in protecting transformers and similar electrical apparatus, it is the usual practice to provide a fuse for protecting the high voltage side of the apparatus, and a circuit breaker to protect the low voltage side of the apparatus. In the case of a fault in the electrical apparatus, the current, will in general, exceed the short circuit current of the device and cause the fuse to blow. As is well understood by those skilled in this art, electrical apparatus, such as transformers, have a certain amount of inherent impedance, due to the inductance and resistance of their windings. Thus, even if the secondary of such apparatus was shorted, only a given maximum current could flow in the primary winding when rated voltage is applied to this winding. This maximum current is often termed the "short circuit current" of the electrical apparatus. However, in case of a fault in the apparatus, for example between the winding and ground, some or all of the winding will be by-passed, depending on the location of the fault. For such fault, the current is not limited by the impedance of the winding and may reach magnitudes greatly in excess of the "short circuit current." For severe overloads or faults on the low voltage line, the circuit breaker will be operated to thereby remove the load from the electrical apparatus. One problem which has been very evident in these presently used types of protective devices is the extreme difficulty in properly coordinating the action of the fuse and the circuit breaker. As is well known to those skilled in the art, it is desirable that the circuit breaker generally operate for all low current faults or overloads, which generally do not indicate a breakdown of the electrical apparatus. However, when the fault current exceeds the short circuit current of the electrical apparatus, it is desirable that the fuse blow since such fault current in general indicates a dangerous fault in the electrical apparatus.

Where the circuit breaker is on the low side of the electrical apparatus it is more difficult to coordinate it with the fuse. This will be readily apparent to those skilled in this art since fault or overload current on the low voltage side of the apparatus does not necessarily have the same ratio to the high voltage current as the normal ratio of the electrical apparatus. This will be readily apparent to those skilled in this art. Consider, for example, a transformer, where the secondary is provided with two line leads and a neutral lead. The normal current ratio of such transformer between the primary and the secondary line leads will be one value, for example 1:30. However, the ratio between the primary and a secondary line and neutral leads will be 1:60. A circuit breaker in the secondary of the transformer coordinated with the fuse for line to line overloads or faults will clearly not be properly coordinated for faults or overloads between line and neutral of the secondary. The problem involved in properly coordinating these two to obtain the desired action set forth earlier is clearly evident. When the breaker is on the high voltage side of the apparatus, in circuit combination with a fuse, it will be evident that it is much easier to coordinate the two devices since both are subjected to the same fault current or overload current at the same time.

Another problem with circuit breakers on the low voltage side is that though they are designed to operate when the oil reaches a dangerous temperature, they only succeed in opening the low voltage line, thus leaving the high voltage current still circulating through the high voltage side of the electrical apparatus. Clearly, in many instances this could still leave dangerous energized faults in the electrical apparatus which would not be de-energized until the fault reached such a magnitude that the high voltage fuse was blown. Clearly, where the fault is of a nature to increase the temperature of the oil to a dangerous temperature without sufficient amount of current to blow the fuse, it is clearly desirable that the entire transformer or other electrical apparatus be removed from the line by opening the high voltage side. From all of the above, it can be seen that it is desirable to provide protection means for electrical apparatus that will provide the desired protection under all circumstances of operation.

Of course, as is well known, many types of present day apparatus, such as transformers, which are presently in service are not provided with the desired overall protection as set forth hereinbefore. In many of these instances the electrical apparatus is protected by a fuse cutout ahead of the apparatus, or dependence is placed upon circuit breakers further along the line. It is clearly desirable that protective means be provided which may be connected to such present day apparatus to change it from an unprotected apparatus to a self-protected electrical apparatus without necessarily rebuilding or completely redesigning such electrical apparatus.

It is, therefore, one object of this invention to provide a combined circuit breaker and fuse for connection to the high voltage side of electrical apparatus.

A further object of this invention is to provide a combined circuit breaker and fuse assembly which is properly coordinated such that the circuit breaker will function up to the short circuit current of the electrical apparatus, and any current above this short circuit current will cause the fuse of the assembly to operate.

A further object of the invention is to provide a circuit breaker and fuse assembly that can be readily applied to electrical apparatus that does not presently have such protection.

A still further object of this invention is to provide a combined circuit breaker and fuse assembly in which the primary current to the electrical apparatus will be automatically removed whenever the current in the electrical apparatus exceeds its designed safe value.

In carrying out this invention in one form, a combined circuit breaker and fuse assembly is provided for electrical apparatus. The fuse is preferably of a current limiting type, and designed to be connected directly to the high voltage line which feeds the electrical apparatus. A circuit breaker is provided, connected electrically in series circuit with the fuse, between the fuse and the primary or the high voltage side of the electrical apparatus. The circuit breaker and fuse are coordinated such that the circuit breaker will operate to disconnect the electrical apparatus from the high voltage line when excessive currents are experienced up to the short circuit current of the electrical apparatus. The fuse will be caused to operate to disconnect the apparatus from the high voltage line whenever excessive currents are experienced which are substantially equal to or exceed the short circuit current of the electrical apparatus. Additionally, the circuit breaker and fuse are mechanically connected in an assembly which may be readily connected to an electrical apparatus without revising such apparatus.

Figure 2:
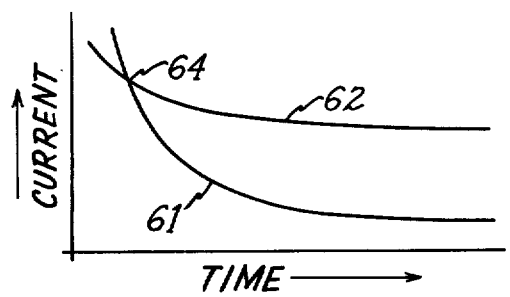

The invention which is sought to be protected will be particularly pointed out in the claims which are appended hereto. However, it is believed that this invention and the manner in which its various objects are obtained, as well as other objects and advantages thereof, will be better understood from the following detailed description of a preferred embodiment thereof, when taken in connection with the accompanying drawing, in which:

FIGURE 1 is a diagrammatic illustration of a transformer showing one form of this invention connected thereto; and FIGURE 2 is a diagram showing the desired time-current characteristics of the combined circuit breaker and fuse of this invention.

Referring now to the drawing, there is disclosed a combined circuit breaker and fuse, shown as being connected in circuit with an electrical apparatus, such as a transformer, to protect such apparatus from overload and fault currents. While this invention is specifically shown and described with reference to a transformer, it will be understood that it is not limited thereto.

As shown in FIG. 1, the circuit breaker and fuse combination comprises a fuse member 10 which is shown as being mounted within a ceramic bushing 12, and having a terminal 14 thereon which terminal may be connected to a high voltage line. One end of the fuse 10 is electrically connected to the terminal 14 while the opposite end of the fuse 10 is electrically connected to a terminal member 16 at the lower end of the ceramic bushing 12. The fuse 10 may advantageously be a current limiting fuse, such as the type disclosed in application Serial No. 127,608, which was filed July 28, 1961 in the name of the present inventor and assigned to the same assignee as this invention.

The circuit breaker is connected electrically in series with the fuse member 10 and is shown in FIG. 1 as a breaker 18 which comprises a terminal member 20 which is adapted to make electrical contact with the spring jaws 22, which are mounted within an explosion chamber 23. The spring jaws 22 are electrically connected to terminal 16 of the fuse member 12. The terminal 20 is connected to a rotatable arm 24 which has connected at one end thereof the lead 26 of the coiled, current-carrying bimetallic member 28. The other end of the coiled, current-carrying bimetallic member 28 is connected to a lead 30 which extends to a terminal board or post 32. The high voltage or primary lead 34 of a high voltage or primary winding is connected to such terminal post. The other end of the high voltage winding may be connected by means of lead 36 to the tank 37 of the transformer 38 which may be grounded. Of course, the lead 36 may be connected through a second high voltage bushing to a second high voltage power line, or may be tied to the neutral of a three phase bank. It will be understood that the core and coil unit 39 of transformer 38 is provided with the usual primary and secondary windings, and a dielectric fluid 35 is used in the transformer 38.

In FIG. 1, the high voltage circuit breaker and fuse assembly of this invention is shown as applied to the transformer 38, being attached to the cover member 40 of such transformer. As shown in the drawing, the ceramic bushing 12 is attached to an opening 42 of the transformer cover 40 and is hermetically sealed in such opening by means of the sealing resin 44 which makes an airtight seal between the bushing 12 and the cover 40. The circuit breaker 18 is connected to a mounting member or board 46, the mounting member in turn being firmly secured to an insulating post 48, which is firmly secured by mounting means 50 to the cover 40 in any desired manner, such as, for example, by welding. In this manner it may be seen that the combined circuit breaker and fuse assembly of this invention is connected directly to the transformer cover and may be directly connected to any desired transformer merely by connecting the high voltage lead to the terminal board 32 which forms a part of the mounting board 46 of the circuit breaker 18. As is indicated, the circuit breaker 18 is provided with an operating member 52 which extends by means of a link 54 through the cover to an operating handle 56 so that the circuit breaker 18 may be opened, or reset after it has opened, from outside of the transformer.

The specific circuit breaker designated 18 in FIG. 1 forms no part of this invention. It is the invention of Gerald P. Hermann and is completely disclosed and claimed in his patent application Serial No. 162,839, filed concurrently herewith entitled High Voltage Circuit Breaker and is assigned to the same assignee as this invention. However, its operation will be briefly described in order to more clearly illustrate the nature of the invention of this application. As will be understood, the high voltage line is connected to the terminal 14 of bushing 12. The current from terminal 14 flows through the current limiting fuse member 10, through terminal 16, the resilient jaws 22, terminal member 20, arm 24, lead 26, the current-carrying bimetallic member 28, lead 30 to terminal board 32, thence through the high voltage lead 34 to the coil of transformer 38, and from lead 36 to the grounded tank 37 of transformer 38. In this manner it can be seen that the high voltage line is utilized to energize the high voltage or primary coil of the transformer 38. When the transformer 38 is subjected to overloads, either through the low voltage line (not shown), or through the high voltage line, the overload or fault current will appear on the current-carrying bimetallic member 28. When the bimetallic member 28 is subjected to sufficient current to heat the bimetallic member 28 it twists, causing a shaft to rotate, in the manner more clearly described in the aforementioned Hermann application, which thereby unlatches member 58, and causes arm 24 to rotate about pivot point 60 through the action of the various springs, to thereby release terminal 20 from the resilient jaws 22. In this manner the high voltage circuit to the primary coil of transformer 38 is broken, thereby de-energizing the transformer 38. Should the transformer 38 be subjected to a high fault current which exceeds the short circuit current of the transformer 38, the fuse member 10 will be caused to blow. The short circuit current will be of such magnitude that it will cause the members in fuse member 10 to fuse, thereby opening the circuit before the current-carrying bimetallic member 28 is enabled to operate sufficiently to unlatch member 28 to thereby cause member 24 to release terminal 20 from the resilient jaws 22. Of course, as will be well understood, the fusible members in the current limiting fuse 10 are designated such that they will be caused to fuse whenever the current therethrough substantially equals or exceeds the short circuit current of the transformer 38. The current-carrying bimetallic member 28 is designed such that its speed in unlatching member 58 will be coordinated with the fusible members within fuse 10 such that it will not operate sufficiently rapidly to open the circuit breaker for a high fault current which substantially equals or exceeds the short circuit current of the electrical apparatus before the fuse member 10 has a chance to open. Since both the circuit breaker 18 and the fuse member 10 are each subjected to the same current at the same time, it can be seen that it would be a relatively simple matter to easily adjust the operating point of these two members, such that the fuse will only open when the fault current of the transformer 38 substantially equals or exceeds the short circuit current of the transformer. For any lower overload current, the circuit breaker 18 will be caused to open. In either event, as will be understood, the transformer 38 will be completely removed from the high voltage line.

Considering FIG. 2, there is shown the ideal fuse and circuit breaker time-current characteristics. As shown in FIG. 2, curve 61 shows the ideal breaker time-current curve, showing that as the current increases the circuit breaker will open more rapidly with respect to the time. The fuse curve shown at 62 as can be seen operates only on higher currents and at a slower time than the breaker for any overload or fault current up to the current indicated at the crossover point 64 of the lines 61—62. At this crossover point it can be seen that curve 61 continues in an upward direction and for currents equal to or greater than the value of current represented by crossover point 64, the circuit breaker will open more slowly than the fuse. Beyond crossover point 64, the fuse will be the first to open for a given overload current. As will of course be understood, the overload current at the crossover point 64 is that overload current which substantially equals the short circuit current of the electrical apparatus, in this case, the transformer 38. By properly coordinating the fusible members within the current limiting fuse 10, and the current-carrying bimetallic member 28 the crossover point 64 may be obtained at the desired point which is substantially equal to the short circuit current of the electrical apparatus. In this manner it will be readily apparent that the proper coordination of the fuse and circuit breaker may be readily obtained when both the circuit breaker and fuse are connected in combination on the high voltage side of the electrical apparatus.

While there has been disclosed and described the combined circuit breaker and fuse assembly of this invention as applied to a transformer, it will be readily understood that this is for purpose of illustration only, and that this device may be readily incorporated into any other type of electrical apparatus where it is found desirable. As hereinbefore disclosed, by attaching the combined circuit breaker and fuse assembly to a cover or other removable portion of an electrical apparatus, the combined circuit breaker and fuse assembly of this invention may be readily applied to any type of electrical apparatus which presently does not have such protection by merely replacing the cover of such electrical apparatus with a cover to which the combined circuit breaker and fuse assembly of this invention is connected. Then, by merely connecting the high voltage or primary lead of the electrical apparatus to the terminal board 32, the electrical protective devices of the combined circuit breaker and fuse assembly of this invention will be immediately applied to such electrical apparatus.

While this invention has been disclosed and described in the present preferred embodiment thereof, it will be readily understood by those skilled in the art that various changes and modifications may be made without departing from the spirit and scope of the invention as set forth in this application. For example, while the current limiting fuse described in the aforementioned Smith application Serial No. 127,608 has been disclosed as the desired fuse, it will be well understood that other types of fuses may readily be applied to this combination. Further, it will be understood that while the circuit breaker of the Hermann application Serial No. 162,839 has been disclosed as the desired circuit breaker for this combination, other circuit breakers may also be used. Therefore it is to be understood that various changes and modifications may be made in this invention without departing from the spirit and scope of the invention as defined in the appended claim.

What is claimed as new and which it is desired to secure by Letters Patent of the United States is.

A high voltage circuit breaker and fuse for providing coordinated protection to an electrical apparatus comprising, in combination;

(1) a removable cover for an electrical apparatus,
(2) a fuse assembly including a bushing,
   (a) said bushing being secured to said cover, and extending therethrough, with portions of said bushing on opposite sides of said cover,
   (b) a first terminal on a portion of said bushing on one side of said cover for connecting to a source of high voltage electrical energy,
   (c) a second terminal on another portion of said bushing on the other side of said cover,
   (d) a fuse member mounted in said bushing and electrically connected between said first and said second terminals,
(3) a circuit breaker assembly including a mounting board,
   (a) an insulating member having one end secured to said mounting board,
      (1) said insulating member having another end secured on said other side of said cover,
   (b) a first terminal on said mounting board electrically connected to said second terminal on said bushing,
   (c) a second terminal on said mounting board for connection to a high voltage winding of an electrical apparatus,
   (d) a movable member movably mounted on said mounting board and electrically connected to said first terminal on said mounting board,
   (e) current responsive means mounted on said mounting board and electrically connected between said movable member and said second terminal on said mounting board,
      (1) said current responsive means being linked to said movable member and responsive to predetermined current flow to cause said movable member to break said electrical connection to said first terminal on said mounting board, whereby said cover may be applied to an electrical apparatus to provide coordinated protection thereto by connecting the high voltage winding of such apparatus to said second terminal on said mounting board.

References Cited in the file of this patent

UNITED STATES PATENTS

| | | |
|---|---|---|
| 2,102,396 | Walle | Dec. 14, 1937 |
| 2,376,789 | Leonard | May 22, 1945 |
| 2,950,370 | Swain | Aug. 23, 1960 |

UNITED STATES PATENT OFFICE

CERTIFICATE OF CORRECTION

Patent No. 3,112,383                           November 26, 1963

Sidney R. Smith, Jr.

It is hereby certified that error appears in the above numbered patent requiring correction and that the said Letters Patent should read as corrected below.

Column 4, line 60, for "designated" read -- designed --.

Signed and sealed this 2nd day of June 1964.

(SEAL)
Attest:

ERNEST W. SWIDER                              EDWARD J. BRENNER
Attesting Officer                                   Commissioner of Patents